Mar. 6, 1923.
J. H. COWAN
1,447,711
EDGING IMPLEMENT
Filed Oct. 23, 1920    2 sheets-sheet 1
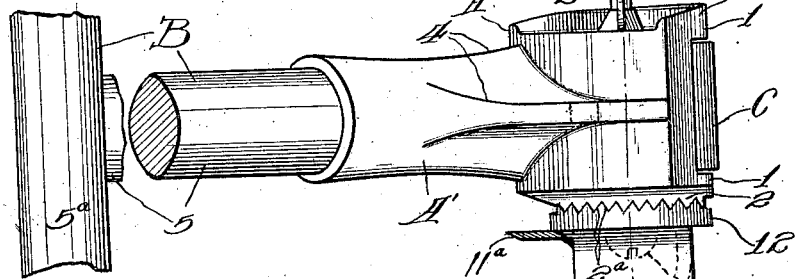
Fig. 1.
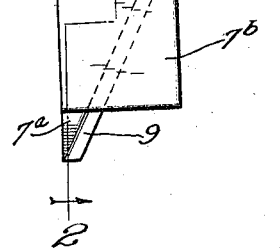
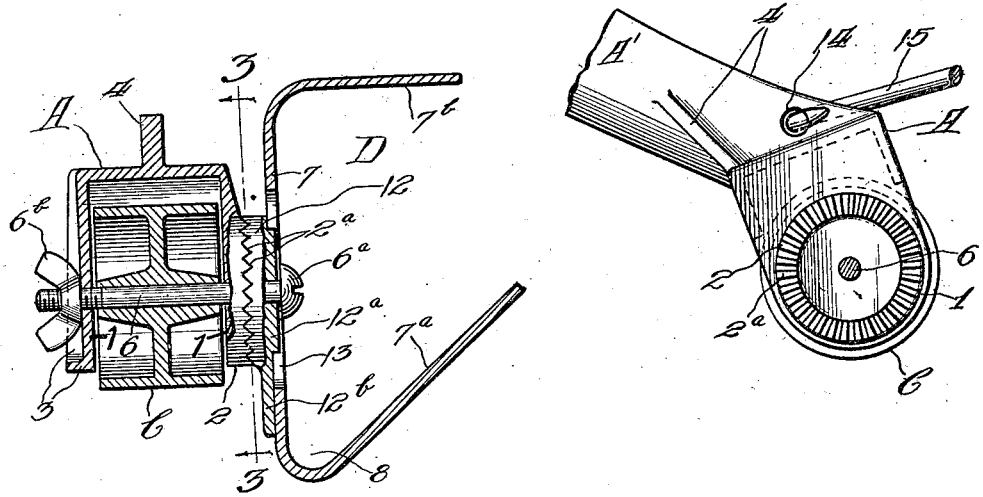
Fig. 2.    Fig. 3.
WITNESS:
Stephen Rebora
INVENTOR.
John H. Cowan,
by Dyrenforth, Lee, Chritton & Wiles,
ATTORNEYS.

Mar. 6, 1923.

J. H. COWAN 1,447,711

EDGING IMPLEMENT

Filed Oct. 23, 1920

2 sheets-sheet 2

WITNESS:
Stephen V. Rebora

INVENTOR.
John H. Cowan
Dyrenforth, Lee, Chritton & Wiles
ATTORNEYS.

Patented Mar. 6, 1923.

1,447,711

UNITED STATES PATENT OFFICE.

JOHN H. COWAN, OF KANSAS CITY, MISSOURI.

EDGING IMPLEMENT.

Application filed October 23, 1920. Serial No. 419,115.

*To all whom it may concern:*

Be it known that I, JOHN H. COWAN, a citizen of the United States, residing at Kansas City, in the county of Jackson and State of Missouri, have invented a new and useful Improvement in Edging Implements, of which the following is a specification.

This invention relates particularly to an implement adapted for the purpose of edging lawns adjacent to sidewalks, flower-beds, etc.; and the primary object is to provide an implement which can be cheaply manufactured and which will enable edging-work to be quickly and easily performed.

The invention is illustrated, in its preferred embodiment, in the accompanying drawings, in which—

Figure 4:
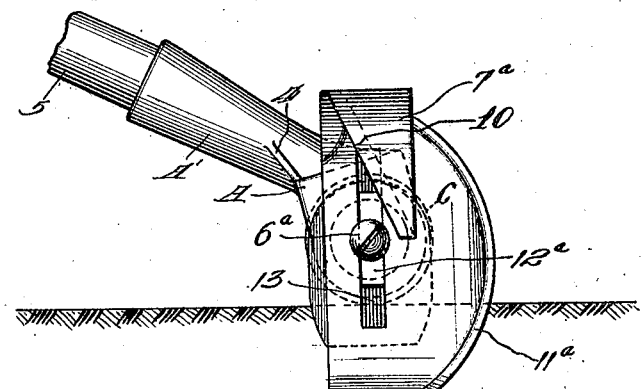
Figure 5:
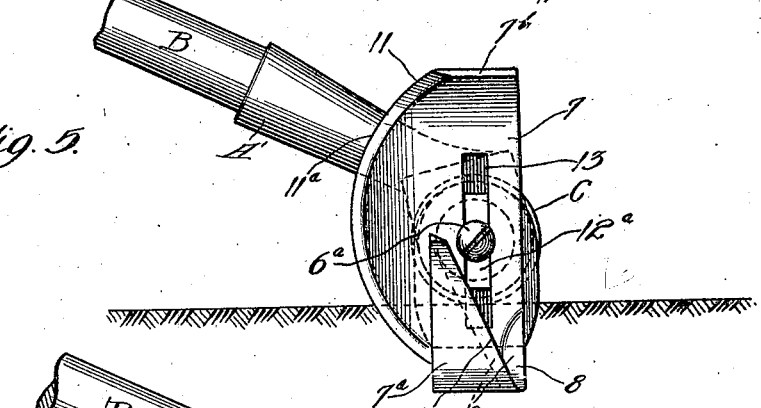

Fig. 1 represents a broken plan view of the improved implement with the blade set for use in edging adjacent to a sidewalk; Fig. 2, a vertical sectional view of the same, taken as indicated at line 2 of Fig. 1; Fig. 3, a broken side elevational view of the frame of the device viewed as indicated at line 3 of Fig. 2; Fig. 4, a side elevational view of the device with the blade set for edging a lawn adjacent to a flower-bed, or the like; Fig. 5, a similar view with the blade set for edging adjacent to a sidewalk; and Fig. 6, a broken side elevational view showing a modification of the device.

Referring to Figs. 1 to 5, inclusive, A represents a forked head or frame in which a wheel is adapted to be journaled, and which is equipped with a tubular handle-socket A′; B, a handle; C, a wheel or roller journaled in the frame A; and D, a laterally disposed adjustable and reversible blade connected with one side of the frame A.

The head portion of the frame A is formed hollow to accommodate the wheel C and is provided at its lower edge with the furcations 1 between which the wheel projects so as to bear upon the sod or upon the sidewalk, as the case may be. One of the side walls forming the head A is provided externally with an embossment 2 equipped with laterally projecting serrations or ratchet teeth $2^a$. The opposite side wall of the head is provided with an external marginal strengthening flange 3. The socket A′ is provided with strengthening ribs 4 which reinforce the socket and the head at the junction of the socket with the head.

The handle B may be of any suitable construction. As shown, it comprises a shaft 5 equipped at its upper end with a cross-bar, or handle-bar, $5^a$, which may be of any suitable length.

The roller C is journaled on a bolt or axle 6 which extends through a perforation in the side walls of the shell which forms the head portion of the frame. The bolt is provided with a head $6^a$ and a wing-nut $6^b$.

The blade D is a compound blade of general U-form, but having one of the wings bent at an acute angle to the web. Thus, the blade comprises a vertical web portion 7 which forms an attaching shank, a wing $7^a$ which forms an acute angle with the web 7, and a wing $7^b$ which is disposed in a plane substantially at right angles to the plane of the web. The wing $7^a$ affords, in connection with the junction portion of the web, an acute angular blade which is adapted to the purpose of cutting a trench adjacent to a sidewalk. The acute angle of this blade is indicated at 8, the blade being suitably curved at the angle, however, on a comparatively small radius. The advance or cutting edge of the blade $7^a$ is beveled on its inner side, as indicated at 9, and the wing portion has its cutting edge retreating or inclined upwardly and rearwardly, as indicated at 10.

The wing $7^b$ of the blade-forming member is beveled at the opposite edge, that is, at the edge opposite that which is provided with the bevel 9, as indicated at 11; and the vertical web-portion 7 of the member is extended forwardly at this edge, thus forming a segmental disk portion $11^a$ which joins the horizontal wing portion $7^b$, the disk portion being also provided with a bevel edge. Thus, as indicated in Fig. 4, the disk portion $11^a$ really affords an inclined or overhanging cutting edge which is adapted to produce a vertical cut in the soil in advance of the horizontal wing portion $7^b$.

The blade D is connected with the head portion of the frame A by means of the bolt 6 and a laterally serrated washer 12 which engages the serrated embossment 2 and which is provided with a central perforation through which the bolt extends. The washer 12 is provided with a diametral spline or flange $12^a$ which engages an elongated central slot 13 with which the web portion of the blade is provided. The outer surface of the spline 12ᵃ does not project quite through the slot 13. The head 6ᵃ of the bolt 6 thus is enabled to clamp the blade firmly against the outer surface of the serrated washer 12. The washer is prevented from turning with relation to the head of the frame by reason of the interlocking serrations, while the blade is prevented from turning with relation to the washer by means of the slot and flange connection. The slot 13 is of sufficient length to permit vertical adjustment of the blade, thus enabling the depth of the cut to be regulated, at will. As shown in Fig. 2, the washer 12 is provided with a depending flange 12ᵇ which affords a vertical shoe which is adapted to bear against the edge of the sidewalk.

From the description given, it will be understood that the cutter is provided at opposite ends with oppositely-turned blades, and that the cutter may be reversed by loosening the bolt 6 sufficiently and turning the cutter and the washer 12 about the bolt 6 as an axis. Also, it will be understood that when the cutter is adjusted with the wing 7ᵇ downwardly, the implement is adapted to the purpose of lawn-edging about flower-beds, or the like, and when the cutter is adjusted as shown in Fig. 5, with the wing 7ᵃ downwardly, the implement is adapted for edging or trenching adjacent to the edge of a sidewalk.

If desired, some suitable means may be provided for enabling the implement to be drawn by one person while it is guided and pushed by another person. In Fig. 3, the web 4 is shown provided with a portion 14 which is engaged by the hook-end of a rod 15. The rod 15 may be provided with a suitable handle (not shown), which will enable a pulling force to be exerted upon the implement.

Figure 6:
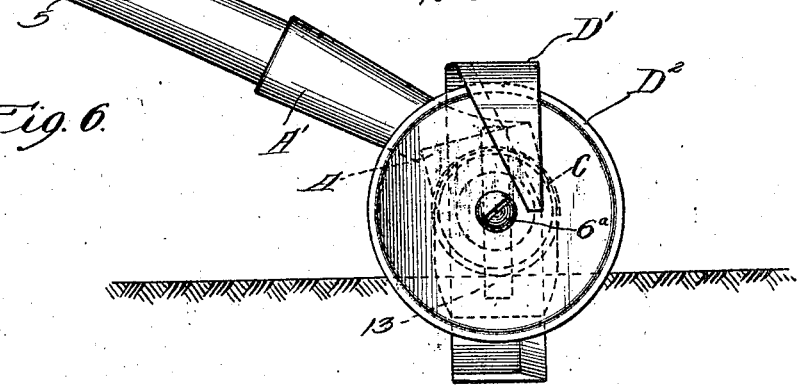

In the modification shown in Fig. 6, the construction is similar to the construction already described, except that the blade D' is formed of a comparatively narrow strip of steel and the disk-like projection 11ᵃ is omitted; and a circular cutter or disk D² is journaled or mounted on the bolt 6, being interposed between the head of the bolt and the cutter D'. In this case, the cutter-disk D² cooperates with the cutter D' when the implement is being used for the purpose of edging a lawn adjacent to a flower-bed, or the like. Fig. 6 shows the implement properly adjusted for this purpose. The remaining parts of the implement are constructed as described above, and the corresponding reference characters are applied in Fig. 6.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is—

1. An implement of the character set forth, comprising a frame, a wheel journaled therein, and a reversible cutter rigidly secured to one side of said frame, said cutter being provided with a pair of laterally projecting blades set at different angles.

2. An implement of the character set forth, comprising a frame, a wheel journaled therein, and a reversible cutter rigidly secured to one side of said frame, said cutter being provided with a pair of laterally projecting blades set at different angles, said blades having opositely turned cutting edges.

3. An implement of the character set forth, comprising a frame equipped with a handle, a wheel journaled in said frame, and a cutter-member rigidly and adjustably secured to one side of said frame, said cutter-member having a vertical attaching portion equipped at its upper and lower ends with wings affording blades disposed at different angles with respect to said vertical portion.

4. An implement of the character set forth, comprising a frame equipped with a handle, a wheel journaled in said frame and a cutter-member rigidly and adjustably secured to one side of said frame, said cutter-member having a vertical attaching portion equipped at its upper and lower ends with wings affording blades disposed at different angles with respect to said vertical portion, said blades having oppositely directed cutting edges.

5. An implement of the character set forth, comprising a frame equipped with a handle and provided with a lateral bearing member, a bolt extending through said frame, a wheel journaled on said bolt, a bearing member engaging said first-named bearing member, said bearing members being provided with means for preventing relative rotation and said second-named bearing member being provided at its outer side with a spline, and a cutter member mounted on the end of said bolt and having a vertical attaching portion provided with a slot engaging said spline, said cutter member being equipped at its ends with laterally projecting blades, one of which forms an acute angle with the vertical attaching portion of the cutter member.

JOHN H. COWAN.